United States Patent
Reilly et al.

(12)
(10) Patent No.: US 6,238,823 B1
(45) Date of Patent: May 29, 2001

(54) NON-STOICHIOMETRIC $AB_5$ ALLOYS FOR METAL HYDRIDE ELECTRODES

(75) Inventors: James J. Reilly, Bellport; Gordana D. Adzic, Setauket; John R. Johnson, Calverton; Thomas Vogt, Cold Spring Harbor; James McBreen, Bellport, all of NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

(21) Appl. No.: 09/163,238

(22) Filed: Sep. 30, 1998

(51) Int. Cl.[7] .................................................. H01M 4/58

(52) U.S. Cl. .................... 429/218.2; 429/220; 429/221; 429/223; 429/225; 420/455; 420/589; 420/900; 423/644

(58) Field of Search ........................... 429/218.2, 220, 429/221, 223, 225; 420/900, 455, 589; 423/644

(56) References Cited

U.S. PATENT DOCUMENTS

| | | | |
|---|---|---|---|
| Re. 34,588 | 4/1994 | Hong .................... | 423/644 |
| 4,687,598 | 8/1987 | Varma ................... | 252/518 |
| 4,946,646 | 8/1990 | Gamo et al. .......... | 420/415 |
| 5,434,022 | 7/1995 | Anani et al. .......... | 429/218 |
| 5,470,675 | 11/1995 | Einerhand et al. ... | 429/101 |
| 5,629,000 | 5/1997 | Matsuura et al. ..... | 429/218 |
| 5,654,115 | 8/1997 | Hasebe et al. ........ | 429/218 |
| 5,656,388 | 8/1997 | Bugga, et al. ........ | 429/40 |
| 5,738,958 | 4/1998 | Lichtenberg .......... | 429/223 |

FOREIGN PATENT DOCUMENTS 60-250557 * 12/1985 (JP) .
0271 043    7/1987 (JP) .

OTHER PUBLICATIONS

Lu, et al. "Electrochemical properties of the LaNi4.6+xSnO.2 System" Journal of Alloys and Compounds 238 (1996) pp. 110–112.*

Baron et al. "Magnetic phase transitions in intermetallic GdNi5–xSn1+x and TbNi5–xSn1+x compounds" Acta Phys. Pol., A, 92(2) (Abstract only).*

J.J.G. Willems and K.H.J. Buschow, "From permanent magnets to rechargeable hydride electrodes", *Journal of the Less–Common Metals*, 129:13–30 (1987).

A. Percheron–Guegan and J.–M. Welter in "Topics in Applied Physics, Hydrogen in Intermetallic Compounds I", L. Schlapbach ed. p., Springer Verlag, NY 63:11–48 (1988).

W. Coene, P.H.L. Notten, F. Hakkens, R.E.F. Einerhand and J.L.C. Daams, "Transmission electron microscopy study of order–disorder phenomena in non–Stoichiometric $LaNi_{5+x}$ and $LaNi_{6-x}Cu_x$ electrode materials", *Philosophical Magazine*, vol. 65, No.6:1485–1502 (1992).

(List continued on next page.)

Primary Examiner—Laura Weiner
(74) Attorney, Agent, or Firm—Margaret C. Bogosian

(57) ABSTRACT

The present invention provides a non-stoichiometric alloy comprising a composition having the formula $AB_{5+X}$ an atomic ratio wherein A is selected from the group consisting of the rare earth metals, yttrium, mischmetal, or a combination thereof; B is nickel and tin, or nickel and tin and at least a third element selected from the group consisting of the elements in group IVA of the periodic table, aluminum, manganese, iron, cobalt, copper, antimony or a combination thereof; X is greater than 0 and less than or equal to about 2.0; and wherein at least one substituted A site is occupied by at least one of the B elements. An electrode incorporating said alloy and an electrochemical cell incorporating said electrode are also described.

10 Claims, 9 Drawing Sheets

OTHER PUBLICATIONS

P.H.L Notten, R.E.F. Einerhand and J.L.C. Daams, "On the nature of the electrochemical cycling stability of nonstoichiometric LaNi5–based hydride–forming compounds Part I. Crystallography and electrochemistry", *Journal of Alloys and Compounds*. 210:221–232 (1994).

P.H.L. Notten, R.E.F. Einerhand and J.L.C. Daams, "Non–stoichiometric hydride–forming compounds: An excellent combination of long–term stability and high electrocatalytic activity", *Zeitschrift für Physikalische Chemie, Bd.*,183:267–279 (1994).

G.D. Adzic, J.R. Johnson, J.J. Reilly, J. McBreen, and S. Mukerjee, "Cerium content and cycle life of multicomponent $AB_5$ hydride electrodes", *J. Electrochem. Soc.*, vol. 142, No. 10 pp. 3429–3433 (1995).

D. Chartouni, F. Meli, A. Züttel, K. Gross, L. Schlapbach, "The influence of cobalt on the electrochemical cycling stability of $LaNi_5$ based hydride forming alloys", *Journal of Alloys and Compounds*, 241:160–166 (1996).

S. Mukerjee, J. McBreen, G.D. Adzic, J.R. Johnson and J.J. Reilly, "The function of cobalt in $AB_5H_x$ metal hydride electrodes as determined by X–ray absorption spectroscopy", *Extended Abstracts*, National Meeting of the Electrochemical Society, San Antonio, Texas, USA Abstract #48, 96–2, (1996).

G.D. Adzic, J.R. Johnson, S. Mukerjee, J. McBreen, J.J. Reilly, "Function of cobalt in $AB_5H_x$ electrodes", *Journal of Alloys and Compounds*, 253–254: 579–582 (1997).

G.D. Adzic, J.R. Johnson, S. Mukerjee, J. McBreen and J.J. Reilly, "Corrosion of $AB_5$ Metal Hydride Electrodes", *Proceedings of the Electrochemical Society Symposium on "Electrochemical Surface Science of Hydrogen Adsorption and Absorption"*, vol. 97–16 (1997).

* cited by examiner

NON-STOICHIOMETRIC $AB_5$ ALLOYS FOR METAL HYDRIDE ELECTRODES

This invention was made with Government support under contract number DE-AC02-98CH10886, awarded by the U.S. Department of Energy. The Government has certain rights in the invention.

BACKGROUND OF INVENTION

This invention relates to compositions for use as metal hydride electrodes for batteries, and, in particular, to new non-stoichiometric $AB_5$ class alloys which can be used in such electrodes.

Secondary (rechargeable) batteries are used as a power source for the numerous portable electronic appliances recently developed. There is, therefore, a need for a secondary power source for these electronic appliances which has a high storage capacity and long cycle life. Although a nickel-cadmium battery has been developed for such a purpose, the capacity of this battery has not been significantly increased in recent years. Further cadmium is a highly toxic material and has a very negative environmental impact.

Also, there is an ongoing investigation into the manufacture of batteries that can be utilized in electric motor vehicles or hybrid motor vehicles which can operate on electric or combustion power. In order for electric powered vehicles to be manufactured at a cost that is viable in the marketplace, a less expensive battery must be developed which has a relatively high capacity and cycle life. A major obstacle to manufacturing such a battery has been the need to include cobalt as one of the components in the anode of such batteries. The high cost of cobalt contributes to the prohibitive expense of such motor vehicle batteries. Thus, there is a need for a battery which includes an anode having good electrochemical properties, but does not require cobalt as a component.

The nickel/metal hydride cell is a rechargeable electrochemical storage cell generically known in the art as the "Ni/MHx cell". The Ni/MHx cell has a positive electrode (cathode) which is composed of nickel oxyhydroxide (NiOOH) and an anode composed of a hydrided metal alloy. The cell also contains an ion-conducting electrolyte and a separator which prevents direct contact between positive and negative electrodes.

The half cell reactions taking place in a Ni/MHx cell may be written as follows:

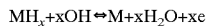

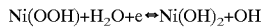

It is in effect a rocking chair type electrochemical cell in which hydrogen is transferred from one electrode to the other. It is convenient that the voltage is essentially the same as the conventional Ni/Cd cells.

Ni/MHx cells have similar operating characteristics to nickel/cadmium (Ni/Cd) cells, but the Ni/MHx cell uses a metal hydride anode in place of cadmium. Metal hydrides are attractive as replacements for the cadmium electrode in the nickel-cadmium batteries from both an environmental and performance viewpoint. More specifically, the advantages of Ni/MHx cells include higher specific energy, higher energy density, improved environmental compatibility, and the potential for a longer cycle life.

However, the charge/discharge cycle lifetime of the Ni/MHx batteries has been limited by degradation of the metal alloy in the electrode due to corrosion. The negative electrode containing the hydrogen absorbing alloy is immersed into an alkaline solution when it is assembled into the secondary cell. The anode is also exposed to oxygen evolving from a positive electrode when the battery is excessively charged. Thus, the hydrogen absorbing alloy may corrode causing its electrode characteristics to deteriorate.

At the anode of the nickel/metal hydride cell, a reversible electrode oxidation reaction occurs with OH ions at the surface of a metal alloy. When the battery is charged, a corresponding reduction reaction occurs at the surface of the metal electrode in which hydrogen is absorbed into the alloy producing a solid metal hydride and hydroxide ion. When the electrode corrodes, less hydrogen is absorbed and the electron conductivity is reduced due to the presence of non-hydrogen absorbing insulating corrosion products. The amount of hydrogen absorbed into the $AB_5$ electrode during the charging process is termed storage capacity. Storage capacity is equal to the ability of the $AB_5$ electrode to discharge electrons, also called discharge capacity. The discharge of electrons is measured in milliampere hours per gram of alloy material, mAh/g.

The metal unit cell expands when absorbing the hydrogen and shrinks when releasing the hydrogen. The increase in volume during the hydriding reaction is termed the atomic volume of hydrogen, $V_H$. This process has been directly correlated to electrode corrosion. See, Willems J J G and Buschow K H J, *J. Less-Common Metals*, 129:13 (1987). The anode is therefore subjected to volumetrically induced strains during charging and discharging cycles. For example, upon the formation of $LaNi_5H_6$ the alloy expands in volume by approximately 24 percent. There is also a corresponding contraction when hydrogen is removed. This imposes great mechanical stress on the alloy which, consequently, pulverizes into fine particles. Furthermore, large volume changes in each charge and discharge cycle increases the flushing action of the electrolyte through the pores and micro-cracks of the electrode, thereby increasing the corrosion rate.

Thus, the alloy of the electrode must resist corrosion due to oxidation, while maintaining a high level of storage capacity.

Currently, there are two types of alloys which are of interest as metal hydride electrodes, the $AB_5$ and the $AB_2$ classes of intermetallic compounds. The $AB_5$ class of compounds have a hexagonal $CaCu_5$ structure where the A component comprises one or more rare earth metals and B consists of Ni, or another transition metal or a transition metal combined with other metals. The $AB_2$ alloys are Laves phases with as many as nine metal components. Alloy formulation is primarily an empirical process where the composition is adjusted to provide one or more hydride forming phases in the particle bulk, but has a surface that is presumed to be corrosion resistant because of the formation of semi-passivating oxide layers. Unlike the $AB_5$ alloys, there are few systematic guidelines which can be used to predict alloy properties. Therefore, the potential use of the $AB_2$ alloy in electrodes is far from realized.

The paradigm compound of the $AB_5$ class of compounds is $LaNi_5$. However, $LaNi_5$ is not a suitable electrode because the hydride is too unstable and the alloy corrodes rapidly in the chemically aggressive battery environment. Alloy modifications to $LaNi_5$ have been made by substituting other elements for lanthanum, nickel, or both, and by changing the overall stoichiometry of the alloy. However, improvements in the charge/discharge cycle lifetime by the introduction of additional metal components into the alloy are usually accompanied by a reduction in the hydrogen capacity of the metal alloy.

The composition of commercial $AB_5$ electrodes revolve around a formula first suggested by Ikowa M, Kawano H, Matsumoto I, and Yanagihara N, Eur. Patent Appl. #0271043 (1987), $MmB_5$, in which mischmetal, a low cost combination of rare earth elements (predominantly La, Ce, Pr and Nd), is used as a substitute for La. The $B_5$ component remains primarily Ni but is substituted in part with Co, Mn, Al. The partial substitution of Ni increases the thermodynamic stability of the hydride phase as well as its corrosion resistance. The $AB_5$ composition in commercial batteries is variable, but most have a composition similar to $MmNi_{3.55}Co_{.75}Mn_{.4}Al_{.3}$. Such electrodes have demonstrated a good storage capacity and cycle life. Ikowa et al. (1987).

The efficacy of this remedy has been attributed in part to the reduction of the molar volume of hydrogen in the hydride phase thereby reducing alloy expansion and contraction during the charge-discharge cycle. This, in turn, leads to a reduction of the flushing action of the electrolyte through the small pores and fissures of the alloy produced in the initial activation process. Willems and Buschow (1987). Consequently, corrosion of the electrode is reduced.

Previous work has shown that the presence of cobalt in $AB_5$ alloy electrodes significantly reduces corrosion both by reducing $V_H$ (See, Adzic G, Johnson J R, Mukerjee S, McBreen J, Reilly J J, *J. Alloys and Compounds* 579:253–254 (1997)) and by the formation of a corrosion inhibiting surface layer (See, Mukerjee S, McBreen J, Adzic G D, Johnson J R, Reilly J J, Extended Abstracts, National Meeting of the Electrochemical Society, San Antonio, Tex., USA, Abstract #48, 96-2, 1996). In addition, there is evidence that cobalt in the alloy lowers the hardness or stiffness of the lattice structure resulting in reduced pulverization when cycled. See Chartouni D, Meli F, Zuttel A, Gross K, Schlapbach L, *J. Alloys and Compounds*, 241:160 (1996).

Currently, cobalt is present in practically all $AB_5$ electrodes used in Ni/MHx batteries. It tends to increase hydride thermodynamic stability and inhibit corrosion. However, it is also expensive and therefore substantially increases battery costs.

Thus, there remains a need for an $AB_5$ structural type alloy which can be used as as a battery electrode that demonstrates a high storage capacity while also having a good cycle life. It is preferable that such an alloy be created without having to utilize cobalt, due to its high cost.

Toward this end the present invention provides a new non-stoichiometric $AB_5$ structural type alloy which can be utilized as an electrode to improve the storage capacity and cycle life of an electrochemical cell or battery which incorporates said electrode.

SUMMARY OF INVENTION

The present invention is a non-stoichiometric structural type alloy which includes a composition having the formula $AB_{5+X}$ as an atomic ratio. The A component can be selected from the group consisting of the rare earth metals, yttrium, mischmetal, or a combination thereof; and the B component is nickel and tin, or nickel and tin and at least a third element selected from the group consisting of the elements in group IVA of the periodic table, aluminum, manganese, iron, cobalt, copper, antimony, or a combination thereof. X is greater than 0 and less than or equal to about 2.0 and at least one A site is occupied by at least one of the B elements. A separate non-stoichiometric structural type alloy is also provided wherein the composition is characterized by the absence of cobalt, even though cobalt is present in practically all commercial $AB_5$ electrodes used in Ni/MHx batteries.

In the preferred embodiment of the invention, A can be lanthanum, e.g., $La_{0.95}Ni_{4.6}Sn_{0.3}$, which normalized with respect to La can be re-written $LaNi_{4.84}Sn_{0.32}$. An alloy with such a composition can contain at least two nickel atoms occupying an A site along the c-axis (vertical axis). In a preferred embodiment, two nickel atoms can be coupled to form a "dumbbell" structure so that each atom is proximal to said A site. Thus, to demonstrate that a pair of nickel atoms occupy one of the A sites, the formula $LaNi_{4.84}Sn_{0.32}$ can be re-written $La_{0.978}Ni_{(0.0221)2}Ni_{4.69}Sn_{0.31}$. In another preferred embodiment, a tin atom occupies a mid-plane $3g$ site of the lattice.

The present invention is also an electrode which contains the non-stoichiometric $AB_5$ structural type alloy. One embodiment includes cobalt, while another is formed without cobalt. The present invention also includes the electrochemical cells which include the electrodes described above.

The present invention also includes a method for enhancing the performance of an electrochemical storage cell or battery which incorporates said electrodes. The present invention achieves this goal through the use of the novel alloy. The structure of the claimed alloy leads to anisotropic lattice deformation where the c-axis is increased and the a-axis is decreased. The structural changes of the alloy result in markedly improved chemical properties.

Furthermore, the present invention includes a method for manufacturing an electrode by incorporating the non-stoichiometric $AB_5$ structural type alloy, with or without cobalt.

As a result of the present invention, it is possible to manufacture a relatively low cost alloy with very good electrochemical properties, i.e., a high level of storage capacity and good cycle life. The alloy of the present invention is able to produce these electrochemical properties without the use of cobalt, an expensive element, as one of its components. Virtually all commercial Ni/MHx batteries utilize cobalt in the alloy of the electrode to provide satisfactory electrochemical properties. The alloy of the invention, in turn, may be used as an anode in an electrochemical cell. These cells can be arranged in a series to form a battery for possible use in, among other things, electric motor vehicles and portable electronic appliances.

For a better understanding of the present invention, together with other and further objects, reference is made to the following description, taken in conjunction with the accompanying drawings and its scope will be pointed out in the appended claims.

DETAILED DESCRIPTION OF THE INVENTION

Applicants have identified a non-stoichiometric $AB_5$ alloy with an unexpected lattice construction which gives the alloy beneficial electrochemical properties, even in the absence of cobalt, an expensive element, as one of the alloy components. Beneficial electrochemical properties means a relatively high level of storage capacity in combination with a good cycle life. By non-stoichiometric $AB_5$ alloy, it is meant that the atoms of the alloy retain the general $CaCu_5$ (or $AB_5$) structural lattice, although the atomic ratio of its components is not $AB_5$.

The non-stoichiometric $AB_5$ structural type alloys of the present invention can be primarily used for the negative electrode of an alkaline, rechargeable nickel-metal hydride battery. It is anticipated that such batteries may ultimately prove useful in powering electric motor vehicles.

Generally, such alloys have the composition: $AB_{5+X}$ wherein "A" is an element selected from the rare earth metals, yttrium, mischmetal or a combination thereof. "B" is nickel and tin, or nickel and tin and at least a third element selected from the group consisting of the elements of group IV of the periodic table, aluminum, manganese, iron, cobalt, copper, antimony, or a combination thereof. The value of X is greater than 0 and less than or equal to about 2.0. Higher values of X may be utilized. However, it has been found that, at such levels of substitution, the alloy does not typically remain single phase as certain elements of the alloy may precipitate out.

Mischmetal (abbreviated Mm) is a naturally occurring mixture of rare earth elements, and therefore its use is more economic than combinations of pure elements. A typical composition of mischmetal is approximately 21 percent La, approximately 57 percent Ce, approximately 15 percent Nd, approximately 6 percent Pr, and approximately 1 percent other.

Figure 1:
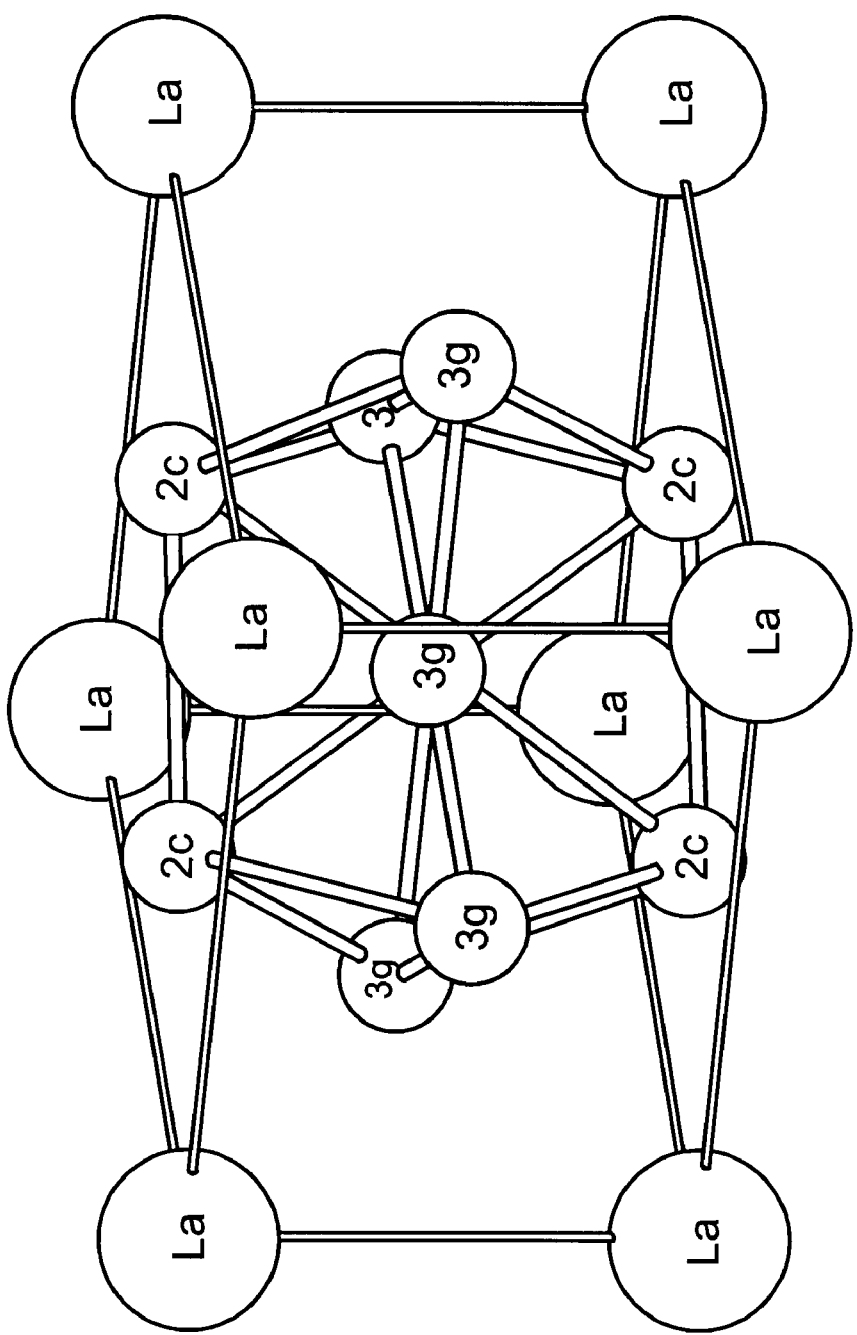
FIG. 1 is a schematic of the hexagonal $CaCu_5$ lattice structure of prior art $AB_5$ alloys, using $LaNi_5$ as an example. Ni occupies the basal plane $2c$ sites and mid-plane $3g$ sites.

FIG. 1, using $LaNi_5$ as an example, demonstrates the hexagonal $CaCu_5$ lattice structure of prior art stoichiometric $AB_5$ alloys. Ni occupies the basal plane 2c sites and mid-plane 3g sites.

By deviating from the $AB_5$ stoichiometry, the excess B atoms are accommodated in the lattice by occupying A atom sites. By occupying the A site, it is meant that the B atoms occupy an area in the vicinity of the A atom location, as opposed to the exact location that the A atom would occupy in the stoichiometric $AB_5$ lattice. In a preferred embodiment, a pair of nickel atoms are coupled to form a "dumbbell" sub-structure which occupies one of the A sites proximally centered on said A site and oriented vertically along the c-axis, shown in FIG. 2. (See reference axes shown schematically in FIG. 2). In another preferred embodiment, Sn occupies the mid-plane 3g sites in the lattice.

Figure 2:
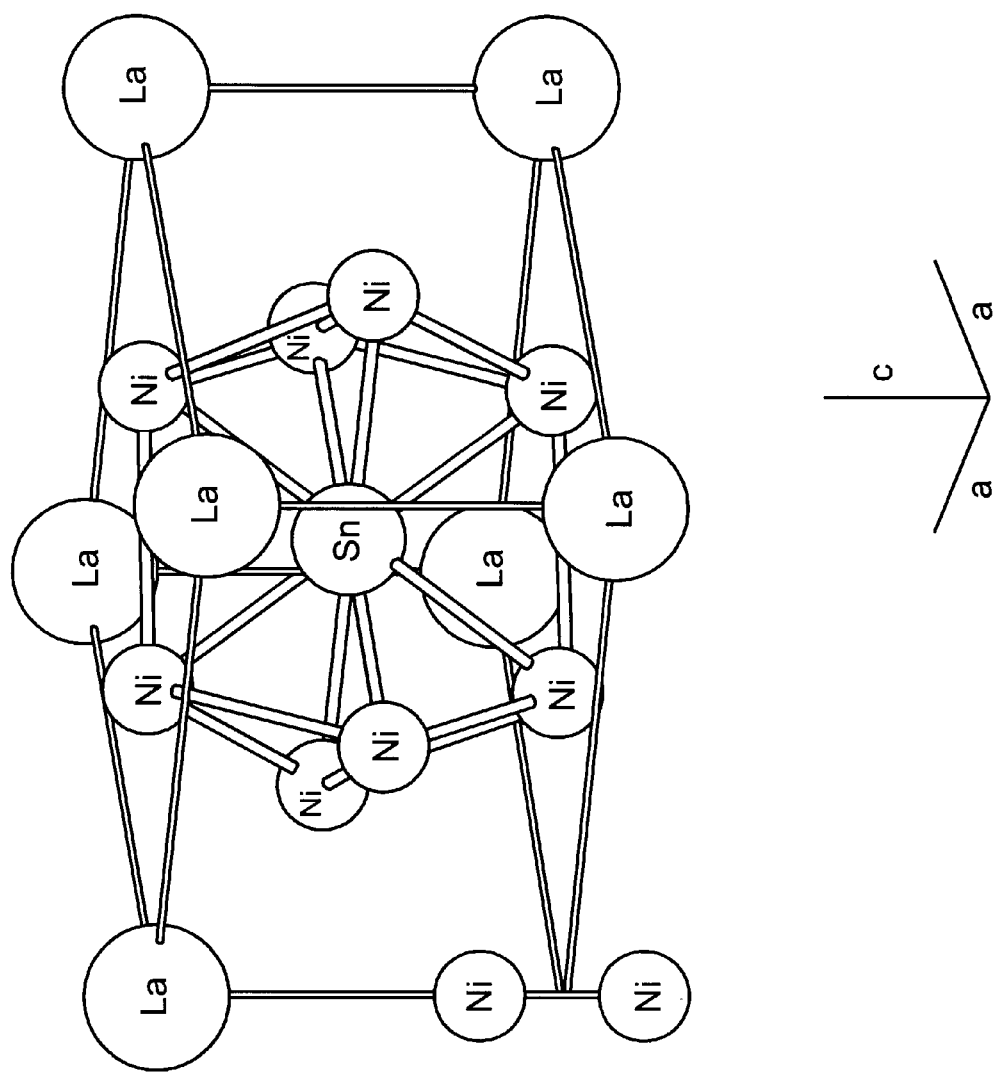
FIG. 2 is a schematic of the non-stoichiometric $AB_{5+X}$ structure showing two Ni atoms coupled to occupy an A site and a Sn atom occupying a mid-plane $3g$ site, as well as a schematic of the axes of the lattice.

Referring to FIG. 2 and using the composition $La_{0.95}Ni_{4.6}Sn_{0.3}$ as an example, the Ni dumbbells are proximally centered on the A site, while Sn occupies one of the 3g sites. FIG. 2 shows the Sn atom in the center of the mid-plane, but Sn may occupy any of the 3g sites. The remaining 3g and 2c sites are occupied by Ni. The atomic radius of Sn (1.58 Å) is much larger that of Ni (1.25 Å), whereas La is 1.87 Å. Because Sn is much closer in size to La, one would normally expect Sn to occupy the vacant A site instead of Ni. Also, because the atomic radius of Sn is so much larger than the Ni, it is quite unexpected that the Sn would occupy one of the 3g sites typically occupied by Ni. However, the pair of nickel atoms forming the dumbbell sub-structure at the A site leads to an anisotropic lattice deformation where the c-axis (vertical axis) is increased and the a-axis (horizontal axis) is decreased. It is believed that this unique structural lattice and the interaction of the atoms therein allows the alloy to maintain a high storage capacity over numerous cycle repetitions, without the need for cobalt as one of the alloy components.

Within the indicated range, the composition $La_{0.95}Ni_{4.6}Sn_{0.3}$ is preferred.

The alloys of the present invention can be manufactured by a number of methods known in the art. Conventional methods involve the components being melted, cast, and ground into a powder. Both laboratory and industrial preparation techniques for many intermetallic hydride formers have been described, particularly for $LaNi_5$ and its substituted analogues. See Percheron-Guegan A, Welter J M, "Topics in Applied Physics, Hydrogen in Intermetallic Compounds I", Springer Verlag, N.Y. 63:11 (1988).

The alloys are prepared from the required constituents in the desired amounts, either in elemental or in pre-alloyed form. A well known technique to form an alloy is arc melting. In this approach, the constituents are placed into a water-cooled hearth. An atmosphere, preferably helium or argon gas, is maintained. An arc-producing electrode is positioned immediately above the constituents, power is supplied to the electrode, and an arc is struck to the hearth and the constituents. The constituents are thereby melted under a temperature of about 900° C. to 1200° C., preferably 900° C., and mixed together. In one alternative approach, the constituents are induction melted. Induction melting is particularly useful for volatile compounds.

After the constituents are melted, the alloy is pulverized to a finely divided form, typically to a size of approximately 150 micrometers. The finely divided form is utilized for use in an electrode because it can be readily supported on a substrate and has a high surface area for reaction.

In a preferred embodiment, the alloy is used to form an electrode, and specifically, an anode. To prepare the anode, a substrate is provided which is preferably a highly porous, chemically inert, electrically conductive material having a large amount of surface area per unit volume of material and pores sufficiently large to allow easy penetration of the alloy particles in paste form. It is also desirable that the substrate of the anode be somewhat compliant to partially absorb volumetric changes during charging and discharging of the electrochemical cell. In the preferred approach, the anode substrate is nickel felt, although any corrosion resistant electronic conductors could be used.

There are various methods of fabricating the active material alloy into a working electrode, including a hot melt technique or polymeric solution technique. In the preferred method of supporting the alloy on the substrate, the alloy powder is mixed with carbon black and Teflon to form a conductive paste, which is pressed onto the nickel felt substrate.

In the hot melt technique, the finely divided alloy is mixed with a small amount of polymeric material such a polytetrafluoroethylene, also sometimes termed Teflon. The mixture is heated to a temperature at which the polymeric material softens while the mixture is pressed into the anode substrate forming the electrode.

In the polymeric solution technique, a polymer is dissolved in an organic solvent. The alloy is mixed into the solution, forming a slurry which is coated onto the substrate. The polymer forms a three dimensional network that anchors the alloy to the substrate.

Any of the approaches described above for adhering the alloy to the anode substrate may include the incorporation of electrically conductive particles such as metals (e.g., copper) or non-metals (e.g., carbon or graphite) before the alloy is applied to the substrate. These conductive materials decrease the resistance of the alloy on the anode substrate.

Figure 3:
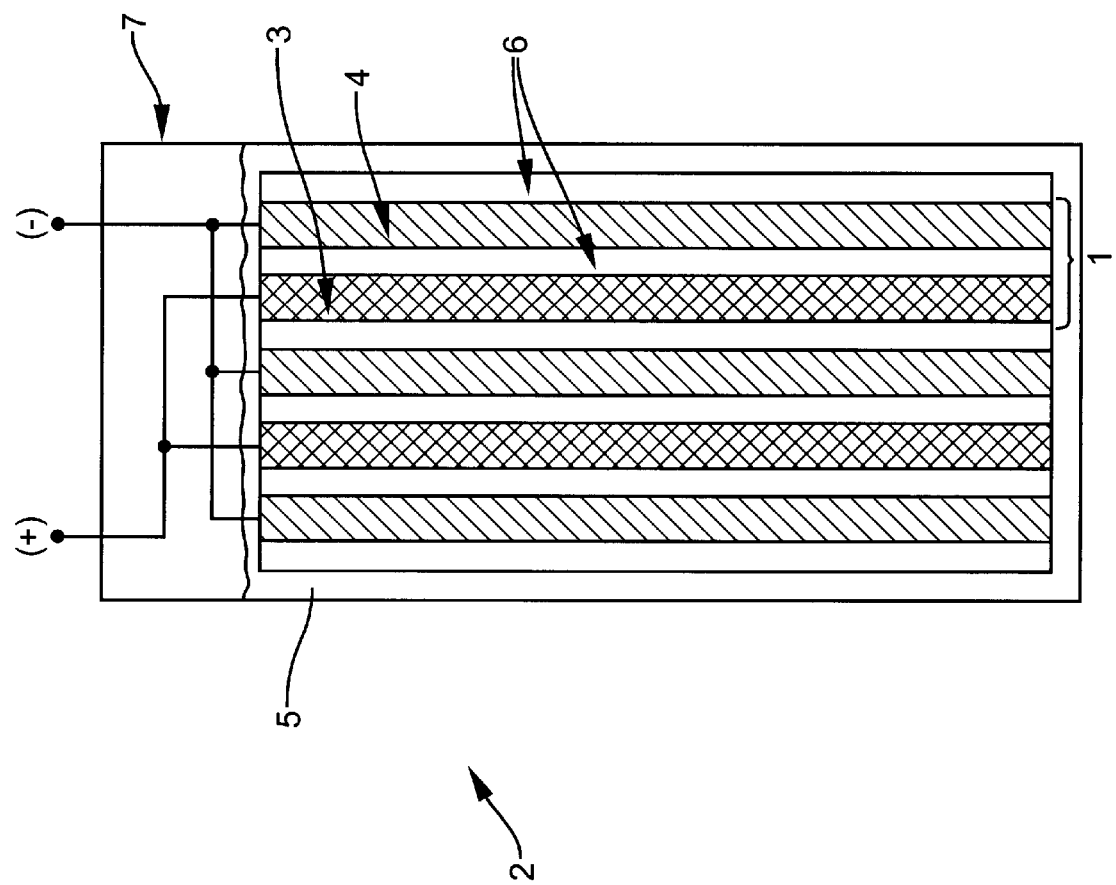
FIG. 3 is a schematic view of an electrochemical storage cell prepared by the process of the invention.

The anode described above can be incorporated as part of a basic electrochemical storage cell FIG. 3 (1). To increase the voltage, capacity, and current flow, a series of such basic cells can be connected to form a battery FIG. 3 (2). The basic components of an electrochemical storage cell include positive electrode (cathode) FIG. 3 (3), negative electrode (anode) FIG. 3 (4), an ion-conducting electrolyte FIG. 3 (5), and a separator FIG. 3 (6) which prevents direct contact between negative and positive electrodes. The alloy of the present invention contained in said electrode can enhance the performance of an electrochemical storage cell or battery which incorporates said electrode by providing a relatively high level of storage capacity in combination with a good cycle life.

A cathode is prepared with any operable structure and in any operable manner. In a preferred approach, a typical nickel oxide/hydroxide cathode is prepared by impregnation of Ni $(OH)_2$ in the pores of a porous nickel substrate either by a chemical or an electrochemical means from a nickel nitrate solution.

The separator material is an electrically nonconductive porous material which isolates cathodes from anodes electrically to avoid shorts, yet retains a sufficient amount of electrolyte to form an electrochemical cell. The separator should be sufficiently stable chemically in the alkaline battery electrolyte to last throughout the service lifetime without producing a detrimental effect by its reaction products. It should retain a sufficiently large amount of electrolyte to provide good ionic conductivity through the separator. For an electrolyte starved sealed cell, the separator should have a sufficient amount of large pores which are not filled with electrolyte for oxygen gas to pass from the cathode to the anode to achieve a good oxygen recombination capability. The oxygen is evolved from the cathode during the overcharge of the cell as an undesirable byproduct of charging the cathode. Operable separators are commercially available nylon or polypropylene felt materials having a thickness of about 150 to 250 micrometers and which are typically made of monofilament polymer fiber of about 20 micrometers or less in diameter. A preferred separator material, which is more costly, is a woven zirconia fabric mechanically reinforced with a polymer.

The anode, cathode, and separator are assembled together with the separator between the anode and the cathode, to form the basic unit of the electrochemical cell. The cell is placed into a container (FIG. 3 (7)) and an electrolyte is added. A preferred alkali electrolyte is a 20 to 40 percent, more preferably a 26 to 31 percent, and more preferably a 31 percent, aqueous solution of potassium hydroxide (KOH). The cells according to the invention can be assembled in a conventional manner to form batteries which include, for example, several cells arranged in a series. FIG. 3 (2).

The following examples are provided to assist in a further understanding of the invention. The particular materials and conditions employed are intended to be further illustrative of the invention and are not limiting upon the reasonable scope thereof.

EXAMPLE 1

Figure 4:
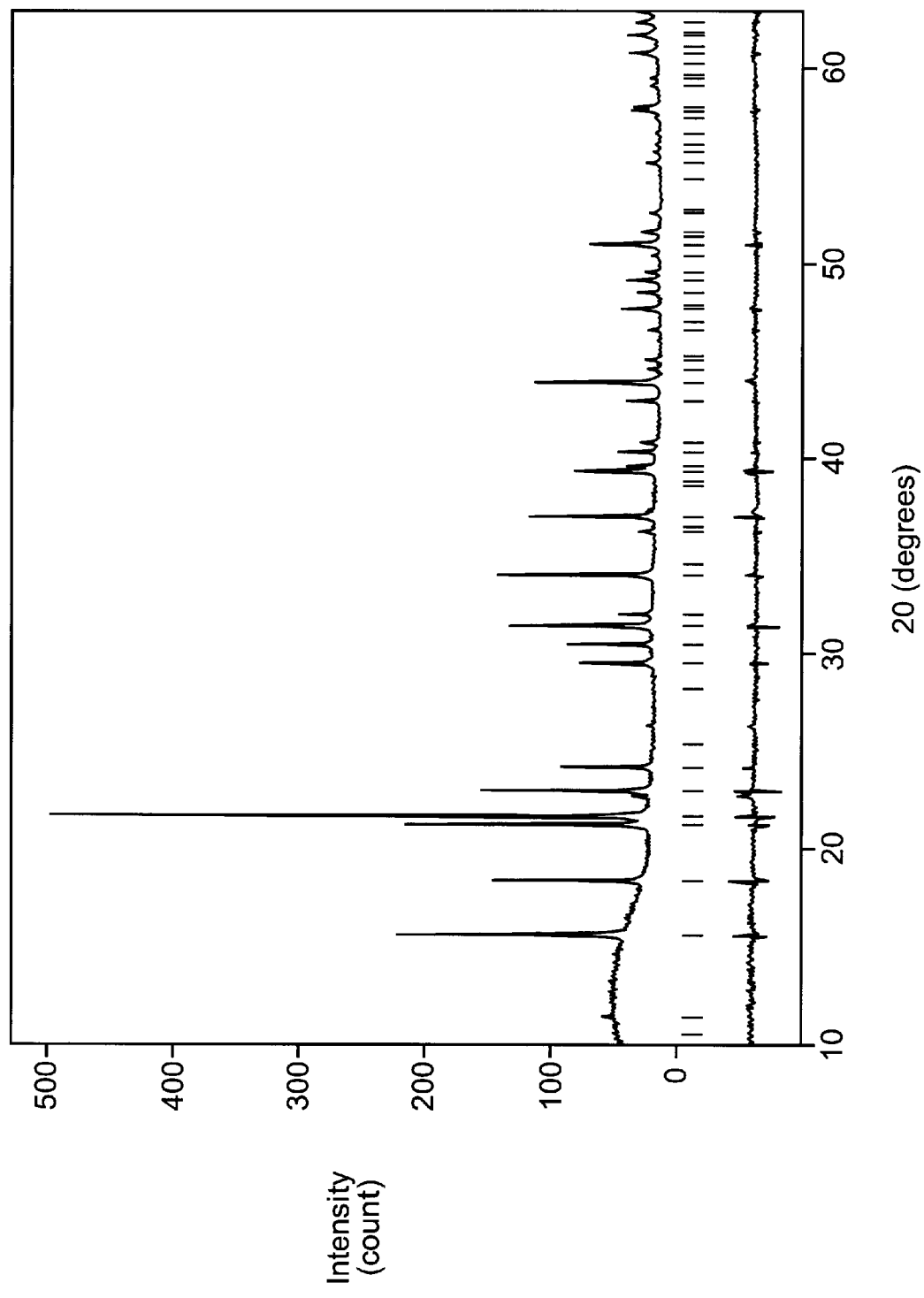
FIG. 4 is a graph demonstrating the x-ray powder diffraction pattern of $La_{0.9}Ni_{4.54}Sn_{.32}$.

FIG. 4 demonstrates the observed high-resolution x-ray power diffraction pattern of an alloy of the present invention, $La_{.9}Ni_{4.54}Sn_{.32}$, and the residual differences with the calculated pattern based on Rietveld refinement. The crystallographic parameters for $La_{0.9}Ni_{4.54}Sn_{.32}$ are given in the table below.

TABLE 1

| Atom | Site Symmetry | x | y | z | site occupancy |
|---|---|---|---|---|---|
| La | 1a,6/mmm | 0 | 0 | 0 | 1 |
| Ni(2) | 2c,-6m2 | 1/3 | 2.3 | 0 | 2 |
| Ni(2) | 3g,mmm | 1.2 | 0 | 1.2 | 2.67(4) |
| Sn | 3g,mmm | 1.2 | 0 | ½ | 0.33(4) |

| | Displacement Parameters | | | | | |
|---|---|---|---|---|---|---|
| Atom | B[1,1] | B[2,2] | B[3,3] | B[2,3] | B[3,1] | B[1,2] |
| La | 0.61(4) | 0.61(4) | 2.07(9) | 0 | 0 | 0.31(2) |
| Ni(1) | 0.94(5) | 0.94(5) | 0.60(8) | 0 | 0 | 0.47(3) |
| Ni(2) | 0.13(5) | 0.13(5) | 0.785(8) | 0 | 0 | 0.06(2) |
| Sn | 0.13(5) | 0.13(5) | 0.75(8) | 0 | 0 | 0.06(2) |

Space Group: P6/mmm (#191)
Cell Constants: a=b=5.06234(3)Åc=4.05666(9) Å

High resolution x-ray powder diffraction patterns were collected on beam line X7A at the National Synchrotron Light Source at Brookhaven National Laboratory. Monochromatic radiation, with a wavelength of 0.77842 Å, was obtained by using a channel-cut double crystal Ge(111) monochromator. After sieving through a −200 mesh (U.S. Sieve size), the samples were loaded into 0.2 mm diameter glass capillaries which were oriented and mounted on a goniometer that rotated (1–2 Hz) during data collection to eliminate any preferred orientation effects. The sample density was measured when filling the capillaries and used to correct for absorption. A linear positive-sensitive detector (PSD) was used to collect data during runs of approximately 4 hours per sample.

The diffraction pattern indicates that the sample is highly crystalline. There are no indications of preferred orientation or evidence of the presence of stacking faults or strain. The P6/mmm space group of the stoichiometric $AB_5$ compound was preserved. The B(3,3) atomic displacement parameter of the A site (See Table above) indicates a large displacement along the c axis compared to the in-plane displacement. Aligning Ni dumbbells along the c-axis in a random fashion together with the normal A sites leads to this type of displacement pattern. The refinement also indicates that the electron density of the B site in the basal plane (2c) can be fully accounted for by Ni occupation. Placing Sn on this site would lead to vacancies which, in view of the stoichiometry, is not very likely. There is a substantial increase in the c axis and a decrease of the a axis of $La_{0.9}Ni_{4.54}Sn_{.32}$ relative to the stoichiometric $LaNi_{4.7}SN_{0.3}$. The contraction of the a axis indicates that the bigger Sn atom (atomic radius of 163 pm) does not occupy the basal plane $2c$ sites. The mid-plane $3g$ sites are occupied by Ni and all of the Sn. If dumbbells of Sn—Ni or Sn—Sn were present, one would expect much larger amounts of strain within the $AB_5$ host structure. However, the very good crystallinity of the alloys precludes such atomic size mismatches. No indications of long range superstructures could be found.

The fraction of Ni substituted A sites, y, is given by $$y=(z-5)/(z+2)$$

where z is the number of B atoms per La. Notten PHL, Einerhand R E F, Daams J L C, *J. Alloys & Comp.*, 210:223 (1994). Thus, the actual chemical formula of $La_{0.9}Ni_{4.54}Sn_{.32}(AB_{5.40})$ is $L_{0.947}Ni_{(0.053)2}(Ni_{4.664}Sn_{0.337})$ indicating that 5.3% of the La atoms are substituted by Ni dumbbells. A schematic of the structure is given in FIG. 2.

EXAMPLE 2

Alloys were prepared from high purity, >99.9%, starting components. Except for alloys obtained from commercial sources all the alloys were prepared by arc melting under helium. After the first melt the ingot was inverted and remelted twice. After annealing each ingot was weighed to determine if there was any weight loss during the arc melting step. In those cases where lead, Pb, was part of the starting mixture a portion of the Pb was lost due to evaporation. Each ingot was annealed at 1173 K for ~3 days after which X-ray diffraction patterns were obtained for each alloy and its lattice parameters determined.

Electrodes were fabricated from a portion of each alloy and subjected to electrochemical cycling studies. Each electrode was prepared by mixing –100 mesh alloy particles with a mixture of polymerized fluorocarbon suspension and carbon black (Vulcan XC-72) in the weight ratio of 17% polymerized fluorocarbon material, 33% carbon black and 50% alloy. The weight of the $AB_5$ intermetallic alloy was 0.075 g. The mixture was then mechanically pressed onto a nickel mesh screen attached to a Ni wire connection which was then sandwiched between two nickel foam (Eltech Corp., Fairport Harbor Ohio) disks 1.7 cm in diameter. Finally, two aluminum foil disks were pressed lightly onto each side of the electrode after which the assembled electrode was inserted into a hydraulic press and pressed at 12,000 psi. The apparent electrode surface area was 4.5 cm$^2$. After pressing, the aluminum foil was removed by dissolving it in concentrated KOH. The electrode was then introduced into an electrochemical cell containing 6 m KOH electrolyte and open to the atmosphere. The counter electrode was a Pt foil and the reference electrode was Hg/HgO. The electrode was activated in situ via successive electrochemical charge and discharge cycles. The cycle life measurements were carried out using a computer controlled battery cycler (Arbin Corp., College Station Tex.). After activation the charging rate was kept constant at 30 ma for two hours. The discharge current was constant at 10 ma and was cutoff when the anodic voltage decreased to 0.70 V vs. the Hg/HgO reference electrode.

Figure 5:
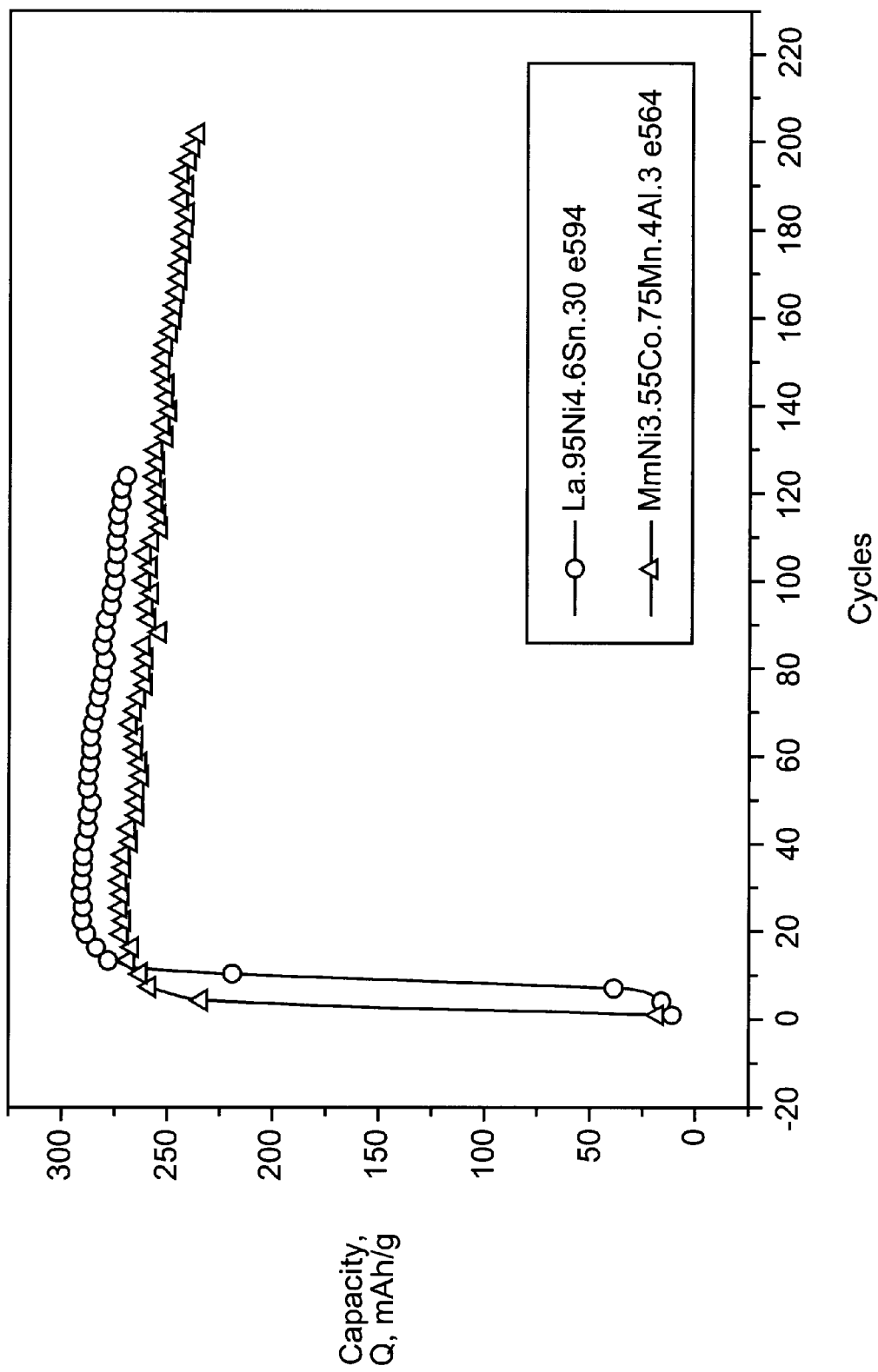
FIG. 5 is a graph demonstrating the results of an experimental comparison of storage capacity vs. cycle repetitions between an alloy of the present invention, $La_{0.95}Ni_{4.6}Sn_{0.3}$, and a commercial alloy which includes cobalt as a component, $MmNi_{3.55}CO_{.75}Mn_{.4}Al_{.3}$.

An alloy of composition $La_{0.95}N_{4.6}Sn_{0.3}$ ($AB_{5.16}$), was prepared as described above. An electrode was fabricated from said alloy and subjected to cycle life testing as described above (experiment #e594). The results are shown in FIG. 5. Also shown, for purposes of comparison is the cycle life of an electrode made from a commercial alloy $MmNi_{3.55}Co_{.75}Mn_{.4}Al_{.3}$(e564) supplied by the Tribacher Auermet.

The results of FIG. 5 demonstrate that the alloy of the invention, even without the presence of cobalt as one of its components, has a higher initial capacity of ~300 mAh/g with a very similar cycle life as the commercial alloy.

EXAMPLE 3

Figure 6:
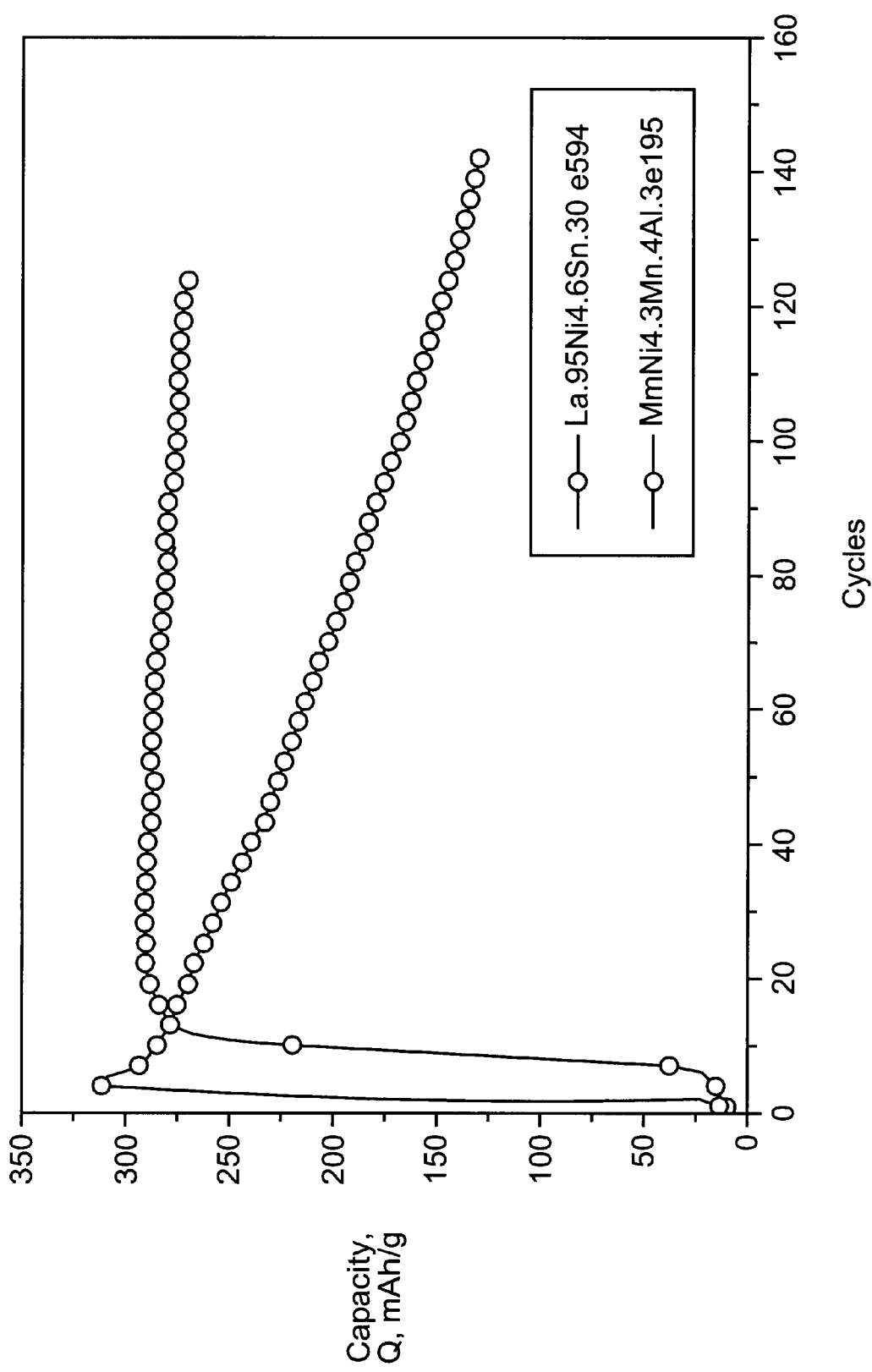
FIG. 6 is a graph demonstrating the results of an experimental comparison of storage capacity vs. cycle repetitions between an alloy of the present invention, $La_{0.95}Ni_{4.7}Sn_{0.3}$, and the prior art, $MmNi_{4.3}Mn_{.4}Al_{.3}$, without cobalt.

An alloy of composition $La_{0.95}Ni_{4.6}Sn_{0.3}$ was then compared with a $MmB_5$ alloy without cobalt. The results are demonstrated in FIG. 6.

The $MmB_5$ has a slightly higher initial capacity of ~315 mAh/g. However, after several cycles, the capacity of $MmB_5$ begins to decrease sharply. After ~20 cycles, the capacity of the two alloys are the same, ~275 mAh/g. After 120 cycles, the $MmB_5$ alloy records a mAh/g of ~145 whereas the alloy of the invention, demonstrating a much better cycle life, records a mAh/g of ~272.

EXAMPLE 4

Figure 7:
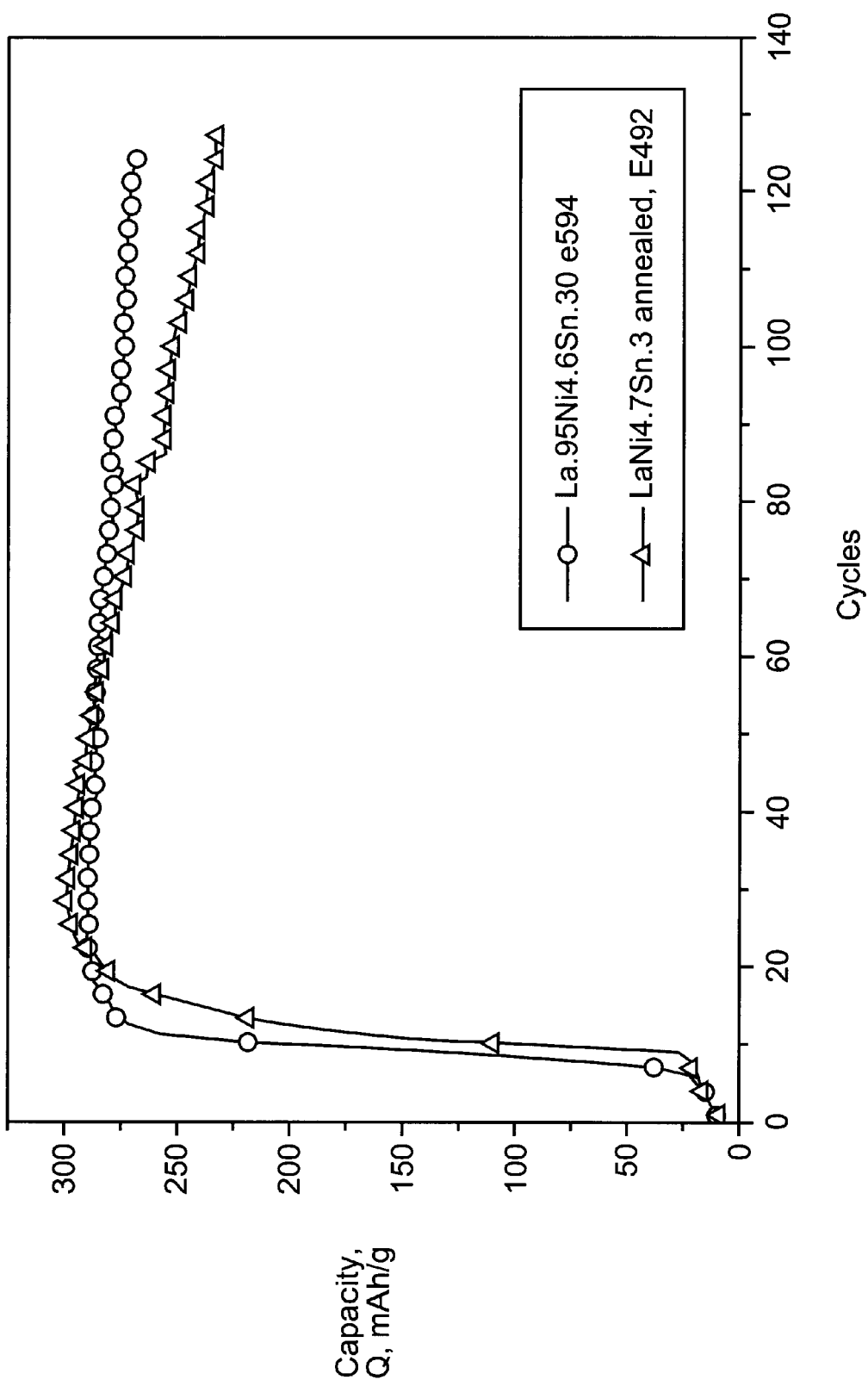
FIG. 7 is a graph showing the results of an experimental comparison of storage capacity vs. cycle repetitions between an alloy of the present invention, $La_{0.95}Ni_{4.6}Sn_{0.3}$, and the prior art, $LaNi_{4.7}Sn_{.3}$.

An alloy of composition $La0.95Ni_{4.6}Sn_{0.3}$ was also compared with a stoichiometric alloy of similar composition, $LaNi_{4.7}Sn_{.3}(AB_{5.0})$. The results of the comparison are demonstrated in FIG. 7.

The alloys demonstrated similar initial capacity. However, the alloy of the invention demonstrates an improved cycle life. At ~120 cycles, the alloy of the invention records a mAh/g reading of ~272, whereas the stoichiometric alloy records a mAh/g reading of ~234.

EXAMPLE 5

Figure 8:
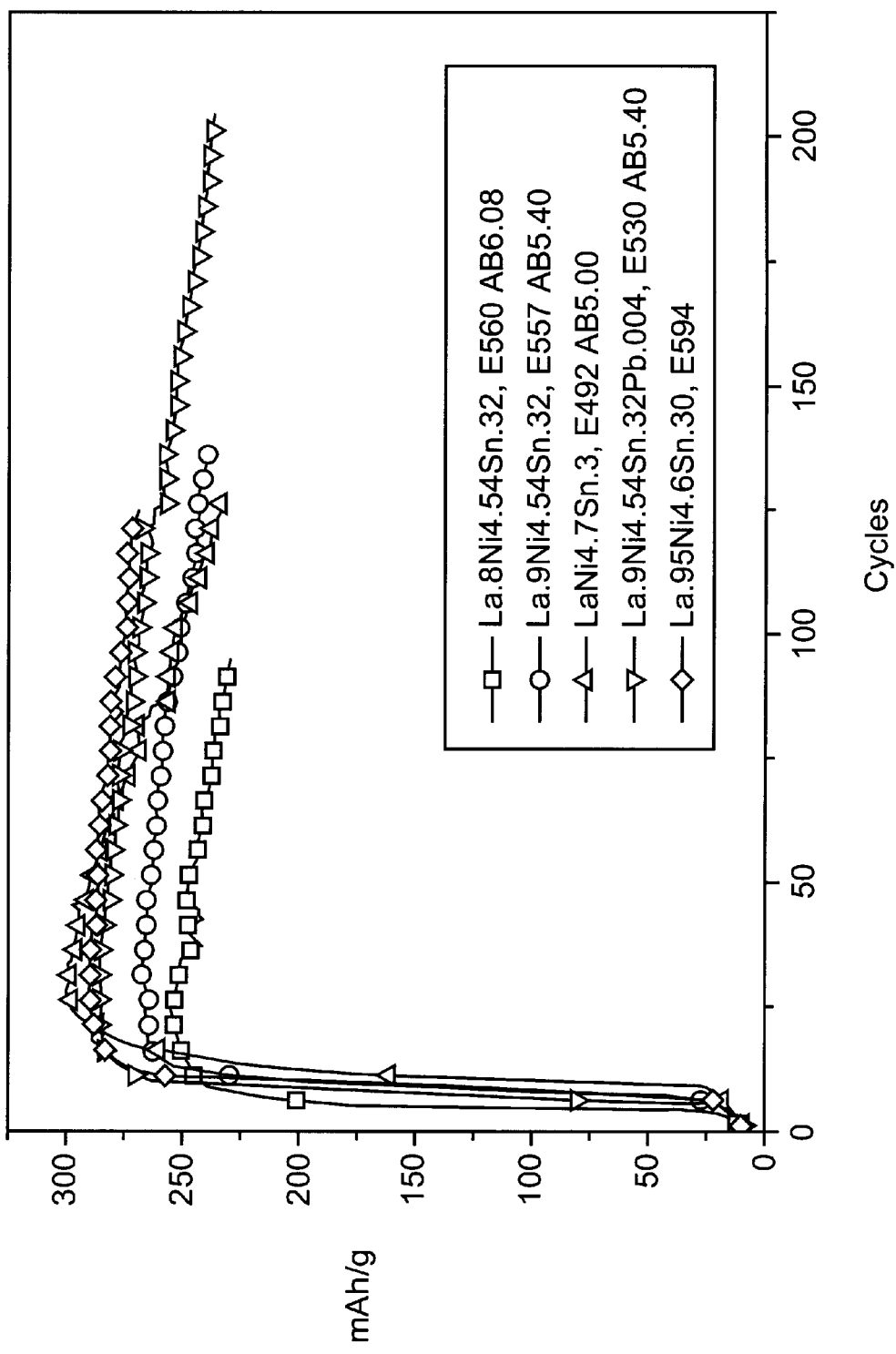
FIG. 8 is a graph demonstrating the results of an experimental comparison of storage capacity vs. cycle repetitions between four different non-stoichiometric alloys of the present invention and the stoichiometric prior art, $LaNi_{4.7}Sn_{.3}$.

An alloy of composition $La_{.8}Ni_{4.54}Sn_{.32}(AB_{6.08})$ was manufactured and utilized as the active material on an electrode as described above. The capacity versus the number of cycles was recorded and graphed along with other alloys of the invention, i.e., $L_{.9}Ni_{4.54}Sn_{.32}Pb_{.004}(AB_{5.40})$, $La_{.9}Ni_{4.54}Sn_{.32}(AB_{5.40})$, $La_{0.95}Ni_{4.6}Sn_{0.3}(AB_{5.16})$, as well as the stoichiometric prior art, $LaNi_{4.7}Sn_{.3}(AB_{5.00})$. The results are depicted in FIG. 8.

Again, the alloy composition $LaNi_{4.7}SN_{.3}$ had a relatively high initial capacity (approximately ~300 mAh/g), but shows a sharp decrease in capacity due to corrosion. All of the alloys of the invention demonstrate a better corrosion rate than the stoichiometric compound. $La_{0.95}Ni_{4.6}Sn_{0.3}$ demonstrates the best performance with an initial capacity of 295 mAh/g and a corrosion rate less than any of the other alloys. The alloy of the invention containing a small amount of lead, $La_{.9}Ni_{4.54}Sn_{.32}Pb_{.004}$, demonstrated a slightly higher initial capacity than the corresponding alloy of the invention without lead, $La_{.9}Ni_{4.54}Sn_{.32}$. Both alloys, however, showed a similar capacity decay. All four of the aforementioned non-stoichiometric alloys demonstrate an adequate initial capacity, approximately 250 mAh/g to approximately 292 mAh/g, with a much improved capacity decay as compared to the stoichiometric prior art alloy, $La_{4.7}Sn_{.3}(AB_{5.00})$.

EXAMPLE 6

Figure 9:
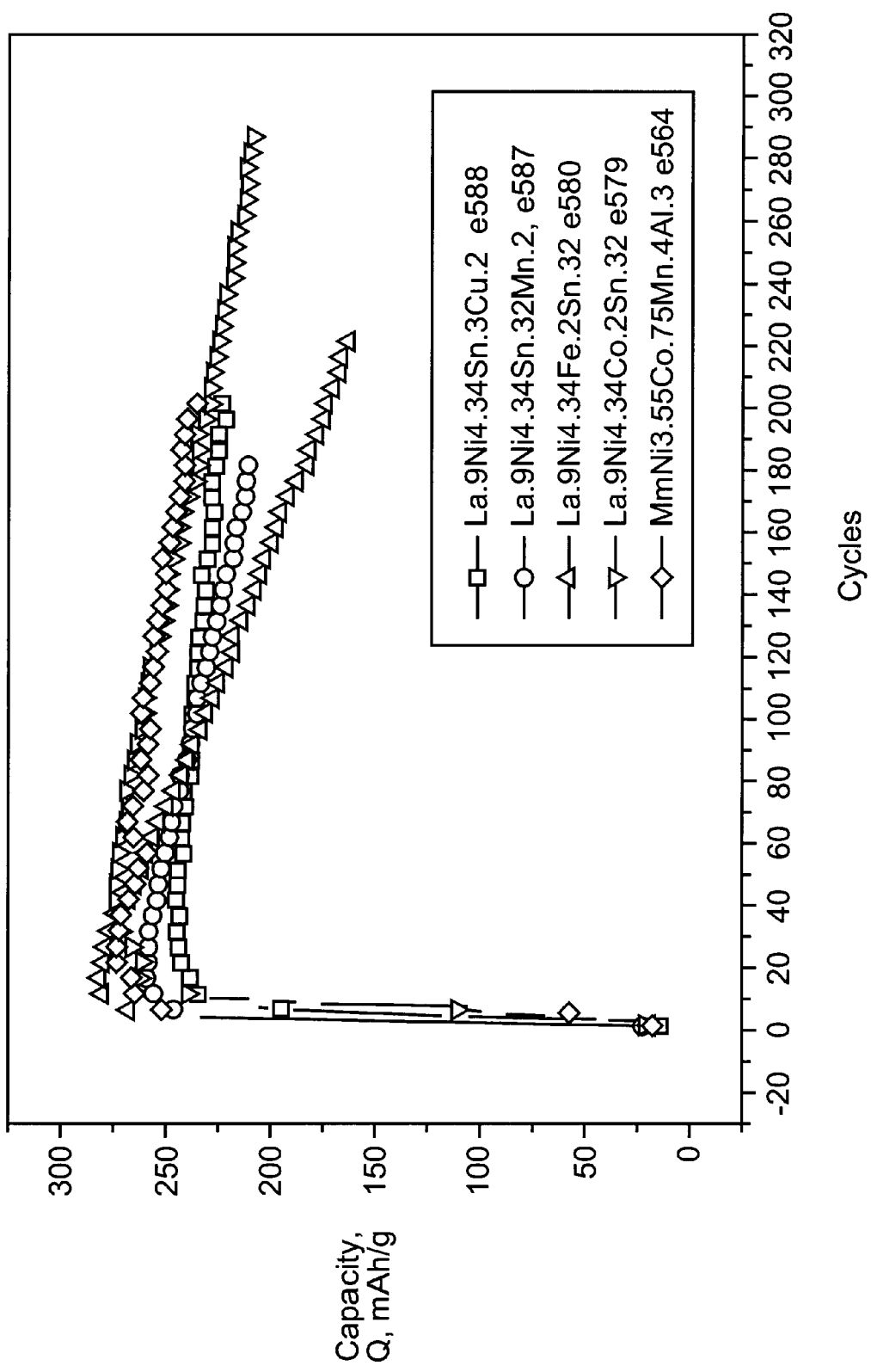
FIG. 9 is a graph demonstrating the results of an experimental comparison of storage capacity vs. cycle repetitions between a commercial alloy containing cobalt and four different non-stoichiometric alloys of the present invention which include a third B element along with Ni and Sn.

Four alloys of the invention were manufactured as described above, including a third B element, along with Ni and Sn. These alloys of the invention were then compared to a commercial $MmB_5$ alloy containing cobalt. The results are demonstrated in FIG. 9.

At ten cycles, all five alloys demonstrate a capacity of between about 230 to 280 mAh/g. As expected, the alloy of the invention and the commercial alloy which both contain cobalt demonstrated the highest initial capacity and good cycle life. However, the alloy of the invention $La_{.9}Ni_{4.34}Sn_{.3}Cu_{.2}(AB_{5.38})$ demonstrated a good initial capacity, ~250 mAh/g with very little decrease in cycle life. At 200 cycles, the alloy containing Cu still records a mAh/g of 225. $La_{.9}Ni_{4.34}Sn_{.32}Mn_{.2}(AB_{5.40})$ also performed very well with an initial capacity of ~260 and a respectable cycle life. The alloy of the invention $La_{0.9}Ni_{4.34}Fe_{.2}Sn_{.32}$ ($AB_{5.40}$) demonstrated the highest initial capacity of ~280, but a more rapid decrease in cycle life than the other alloys tested.

The results of the experiments demonstrate a common behavior found in almost all MHx electrodes. There is an initial steep increase in capacity which comprises the activation process. After activation, a maximum in storage capacity is reached. This is followed by an almost linear decrease in capacity which may be termed capacity decay, defined as the slope of the capacity vs. cycle curve. The capacity decay is caused by the buildup of a corrosion product which cannot absorb hydrogen.

The examples and description above demonstrate that the alloys of the present invention can display electrochemical properties equal to a commercial alloy containing cobalt. However, due to the absence of cobalt in the alloy of the preferred embodiment, the alloy of the present invention is much less expensive to manufacture. The alloys of the present invention demonstrate much superior electrochemical properties than the $MmB_5$ alloy without cobalt. A stoichiometric equivalent of the alloy of the present invention, known in the prior art, demonstrated a similar initial storage capacity. However, the alloy of the invention demonstrated an improved cycle life. Thus, the alloys of the present invention demonstrate the necessary electrochemical properties sought for use as an electrode, even without the use of cobalt.

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

What is claimed is:

1. A non-stoichiometric $AB_5$ structural type alloy comprising a composition having the formula $AB_{5+X}$ as an atomic ratio and a crystal lattice,
   wherein A is lanthanum or lanthanum and at least one other element selected from the group consisting of the rare earth metals, yttrium, mischmetal, or a combination thereof;
   wherein B is nickel and tin, or nickel and tin and at least a third element selected from the group consisting of the elements in group IVA of the periodic table, aluminum, manganese, iron, copper, antimony, or a combination thereof;
   wherein X is greater than 0 and less than or equal to about 2.0;
   wherein at least one substituted A site is occupied by two nickel atoms paired forming a dumbbell sub-structure proximally centered on said A site and oriented vertically along the c-axis; and
   wherein said composition does not contain cobalt.

2. A non-stoichiometric $AB_5$ structural type alloy as described in claim 1 wherein the tin atoms occupy the mid-plane of the lattice.

3. A non-stoichiometric $AB_5$ structural type alloy as described in claim 1 wherein said alloy is $La_{0.95}Ni_{4.6}Sn_{0.3}$.

4. An electrode which comprises a non-stoichiometric $AB_5$ structural type alloy having a crystal lattice and the formula $AB_{5+X}$ as an atomic ratio supported on a substrate
   wherein A is lanthanum or lanthanum and at least one other element selected from the group consisting of the rare earth metals, yttrium, mischmetal, or a combination thereof;
   wherein B is nickel and tin, or nickel and tin and at least a third element selected from the group consisting of the elements in group IVA of the periodic table, aluminum, manganese, iron, copper, antimony, or a combination thereof;
   wherein X is greater than 0 and less than or equal to about 2.0;
   wherein at least one substituted A site is occupied by two nickel atoms paired forming a dumbbell sub-structure proximally centered on said A site and oriented vertically along the c-axis; and
   wherein said composition does not contain cobalt.

5. An electrode as described in claim 4 wherein the tin atoms occupy the mid-plane of the lattice.

6. An electrode as described in claim 4 wherein said alloy is $La_{0.95}Ni_{4.6}Sn_{0.3}$.

7. An electrochemical storage cell comprising an electrolyte and an electrode which comprises a non-stoichiometric $AB_5$ structural type alloy having a crystal lattice and the formula $AB_{5+X}$ as an atomic ratio supported on a substrate
   wherein A is lanthanum or lanthanum and at least one other element selected from the group consisting of the rare earth metals, yttrium, mischmetal, or a combination thereof;
   wherein B is nickel and tin, or nickel and tin and at least a third element selected from the group consisting of the elements in group IVA of the periodic table, aluminum, manganese, iron, copper, antimony, or a combination thereof;
   wherein X is greater than 0 and less than or equal to about 2.0;
   wherein at least one substituted A site is occupied by two nickel atoms paired forming a dumbbell sub-structure proximally centered on said A site and oriented vertically along the c-axis; and
   wherein said composition does not contain cobalt.

8. An electrochemical storage cell as described in claim 7 wherein said alloy is $La_{0.95}Ni_{4.6}Sn_{0.3}$.

9. A method for enhancing the performance of an electrochemical cell which comprises the employment of an electrode comprising a non-stoichiometric $AB_5$ structural type alloy comprising a composition having a crystal lattice and the formula $AB_{5+X}$ as an atomic ratio supported on a substrate
   wherein A is lanthanum or lanthanum and at least one other element selected from the group consisting of the rare earth metals, yttrium, mischmetal, or a combination thereof;
   wherein B is nickel and tin, or nickel and tin and at least a third element selected from the group consisting of the elements in group IVA of the periodic table, aluminum, manganese, iron, copper, antimony, or a combination thereof;
   wherein X is greater than 0 and less than or equal to about 2.0;
   wherein at least one substituted A site is occupied by two nickel atoms paired forming a dumbbell sub-structure proximally centered on said A site and oriented vertically along the c-axis; and wherein said composition does not contain cobalt.

10. A method for manufacturing an electrode comprising the incorporation of a non-stoichiometric $AB_5$ structural type alloy having a crystal lattice and the formula $AB_{5+X}$ as an atomic ratio wherein A is lanthanum or lanthanum and at least one other element selected from the group consisting of the rare earth metals, yttrium, mischmetal, or a combination thereof;

wherein B is nickel and tin, or nickel and tin and at least a third element selected from the group consisting of the elements in group IVA of the periodic table, aluminum, manganese, iron, copper, antimony, or a combination thereof;

wherein X is greater than 0 and less than or equal to about 2.0;

wherein at least one substituted A site is occupied by two nickel atoms paired forming a dumbbell sub-structure proximally centered on said A site and oriented vertically along the c-axis; and wherein said composition does not contain cobalt.

* * * * *